(12) United States Patent
Kamijo et al.

(10) Patent No.: US 8,964,176 B2
(45) Date of Patent: Feb. 24, 2015

(54) SPECTROMETER, AND IMAGE EVALUATING UNIT AND IMAGE FORMING DEVICE INCORPORATING THE SAME

(71) Applicants: Naohiro Kamijo, Kanagawa (JP); Kohei Shimbo, Kanagawa (JP); Yoichi Kubota, Tokyo (JP); Manabu Seo, Kanagawa (JP)

(72) Inventors: Naohiro Kamijo, Kanagawa (JP); Kohei Shimbo, Kanagawa (JP); Yoichi Kubota, Tokyo (JP); Manabu Seo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 111 days.

(21) Appl. No.: 13/785,436

(22) Filed: Mar. 5, 2013

(65) Prior Publication Data

US 2013/0235376 A1    Sep. 12, 2013

(30) Foreign Application Priority Data

Mar. 9, 2012 (JP) ................. 2012-052478

(51) Int. Cl.

| | |
|---|---|
| *G01J 3/28* | (2006.01) |
| *G01J 3/40* | (2006.01) |
| *G01J 3/42* | (2006.01) |
| *G01J 3/02* | (2006.01) |
| *G01J 3/18* | (2006.01) |
| *G01J 3/50* | (2006.01) |
| *G03G 15/00* | (2006.01) |

(52) U.S. Cl.
CPC ................. *G01J 3/42* (2013.01); *G01J 3/0297* (2013.01); *G01J 3/18* (2013.01); *G01J 3/2823* (2013.01); *G01J 3/50* (2013.01); *G03G 15/00* (2013.01); *G01J 3/0208* (2013.01); *G01J 3/024* (2013.01); *G01J 3/0229* (2013.01); *G01J 3/0262* (2013.01); *G01J 2003/503* (2013.01)
USPC .......................................... 356/326; 356/303

(58) Field of Classification Search
USPC .................................................. 356/303, 326
See application file for complete search history.

(56) References Cited

U.S. PATENT DOCUMENTS

| | | | |
|---|---|---|---|
| 5,933,520 | A | 8/1999 | Ishimoto et al. |
| 6,081,332 | A | 6/2000 | Kojima |
| 6,975,949 | B2 | 12/2005 | Mestha et al. |
| 7,057,723 | B2 | 6/2006 | Klock et al. |

(Continued)

FOREIGN PATENT DOCUMENTS

| | | |
|---|---|---|
| CN | 1276525 A | 12/2000 |
| EP | 1344193 | 7/2007 |

(Continued)

OTHER PUBLICATIONS

Miyake, Yoichi. "Analysis and Evaluation of Digital Color Images," vol. 10, University of Tokyo Press, Feb. 25, 2000, pp. 154-157.

(Continued)

*Primary Examiner* — Roy M Punnoose
(74) *Attorney, Agent, or Firm* — Harness, Dickey & Pierce, P.L.C.

(57) ABSTRACT

A spectrometer includes a light source to project a light beam to a target object, an optical element including a plurality of apertures through which the light beam reflected by the target object transmits, a diffraction element to form diffracted images from a plurality of light beams having transmitted through the optical element, and a light receiving element to receive the diffracted images formed by the diffraction element and including an optical shield to block a diffracted image other than a certain-order diffracted image.

10 Claims, 19 Drawing Sheets

(56) References Cited

U.S. PATENT DOCUMENTS

| | | | |
|---|---|---|---|
| 7,671,992 B2 | 3/2010 | Ehbets et al. | |
| 2011/0063615 A1 | 3/2011 | Shimbo et al. | |
| 2011/0106472 A1* | 5/2011 | Seo et al. | 702/76 |
| 2011/0222056 A1* | 9/2011 | Seo et al. | 356/303 |
| 2011/0299104 A1* | 12/2011 | Seo et al. | 358/1.9 |
| 2011/0317149 A1 | 12/2011 | Shimbo et al. | |
| 2013/0063723 A1 | 3/2013 | Shimbo et al. | |

FOREIGN PATENT DOCUMENTS

| | | |
|---|---|---|
| JP | H10-187057 A | 7/1998 |
| JP | 2002-310799 | 10/2002 |
| JP | 2003-139702 | 5/2003 |
| JP | 2004-093326 A | 3/2004 |
| JP | 3566334 | 6/2004 |
| JP | 2004-184834 A | 7/2004 |
| JP | 2005-315883 | 11/2005 |
| JP | 2008-518218 | 5/2008 |
| JP | 2011-145233 | 7/2011 |

OTHER PUBLICATIONS

U.S. Appl. No. 13/741,513, filed Jan. 15, 2013.
U.S. Appl. No. 13/737,157, filed Jan. 9, 2013.
Chinese Office Action dated Oct. 14, 2014 issued in corresponding Chinese Application No. 201310156285.3 (with English translation).

* cited by examiner

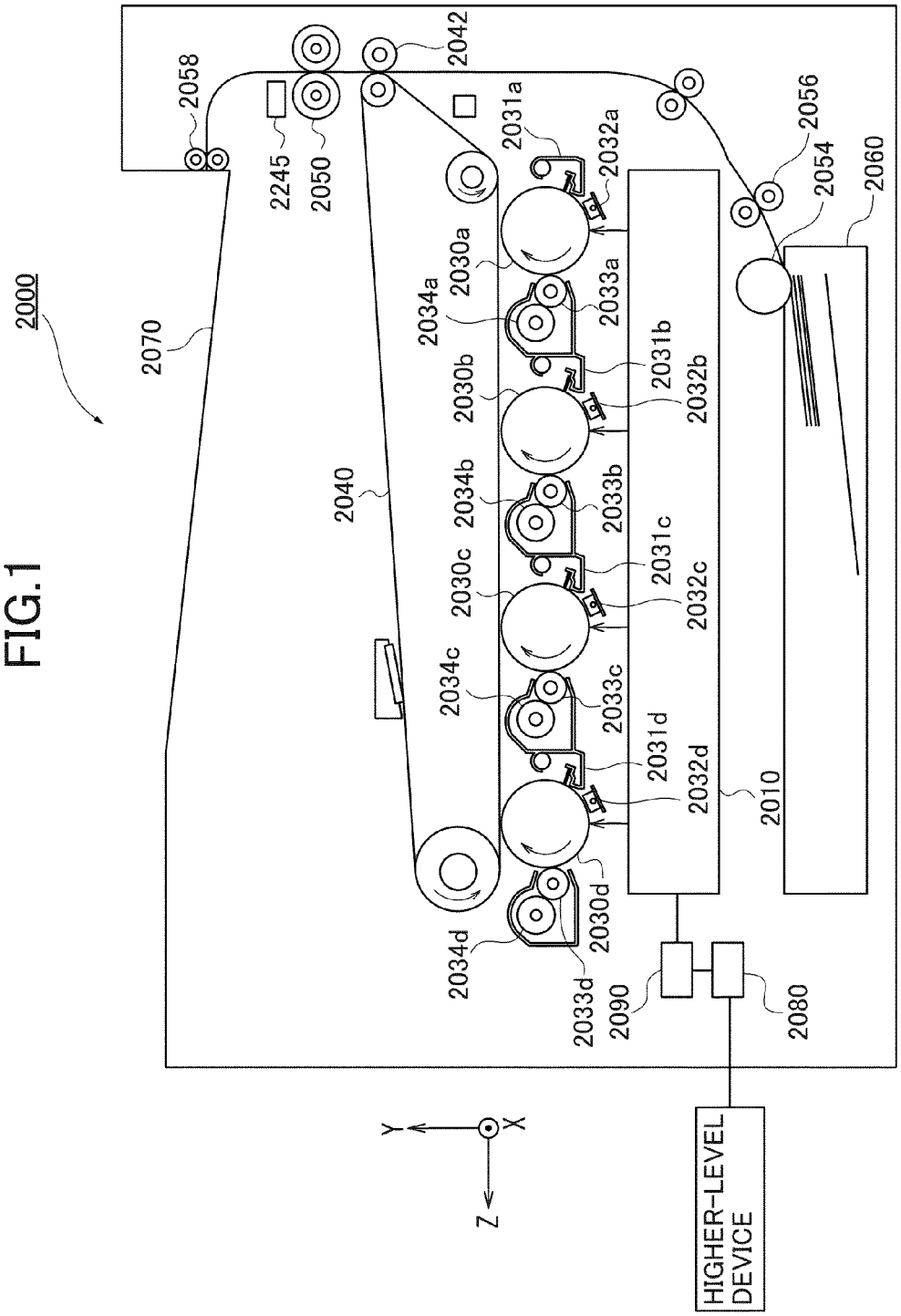

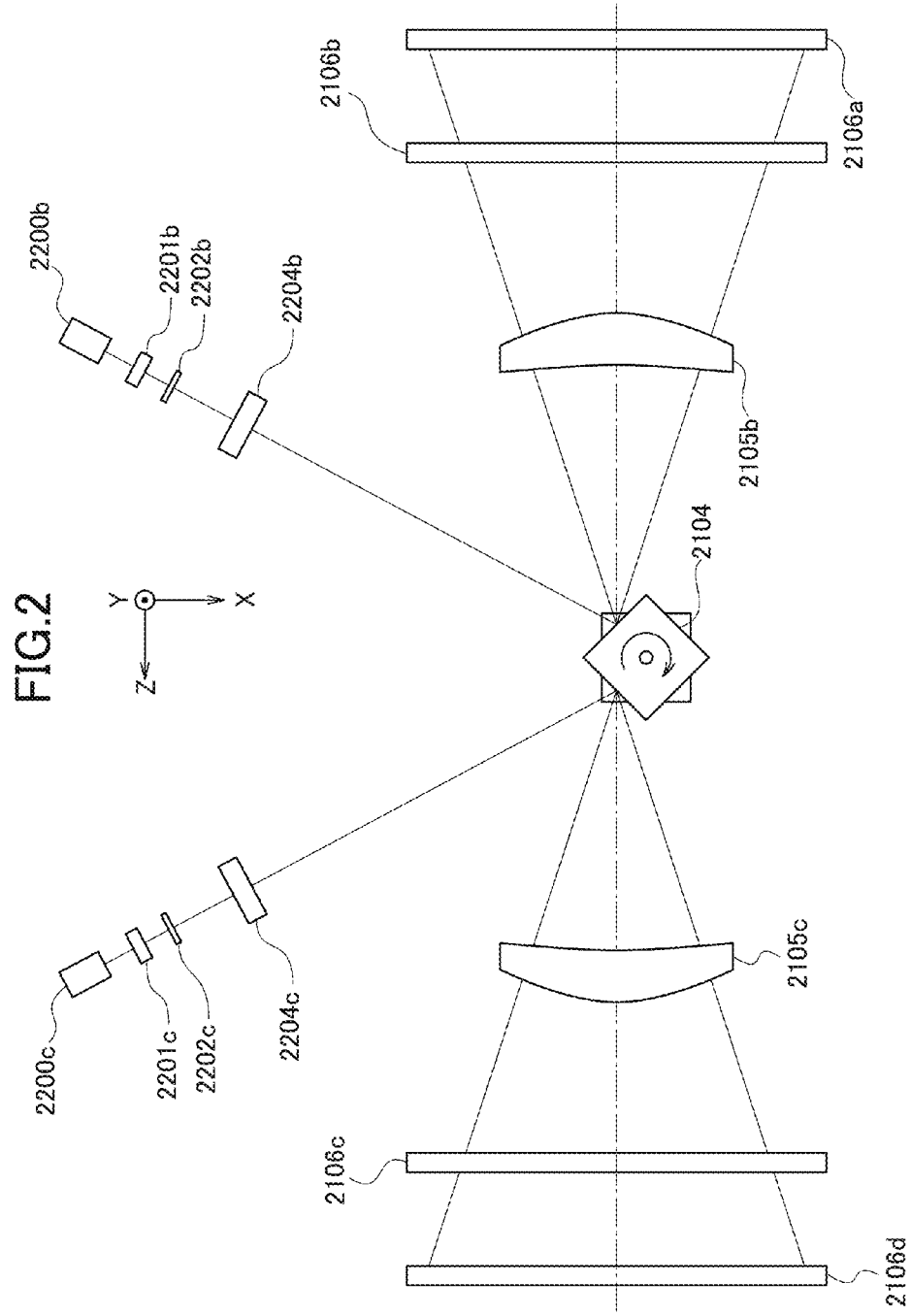

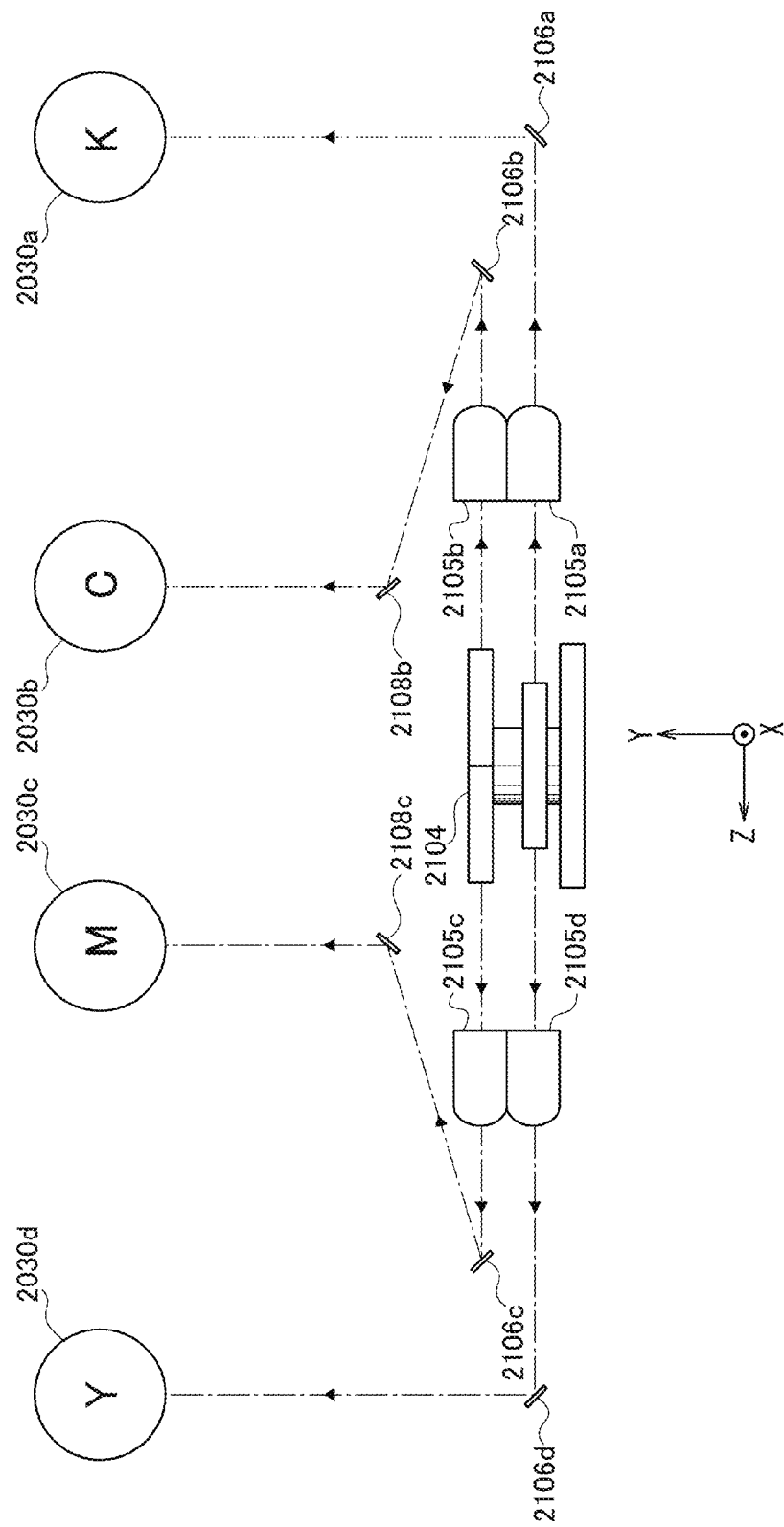

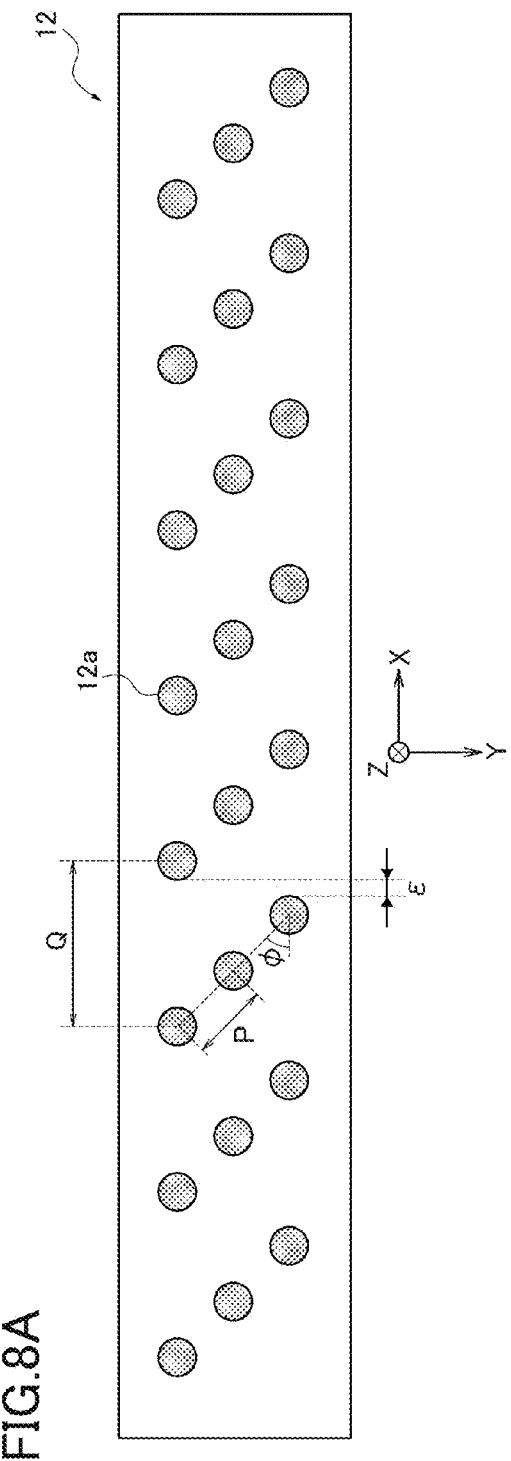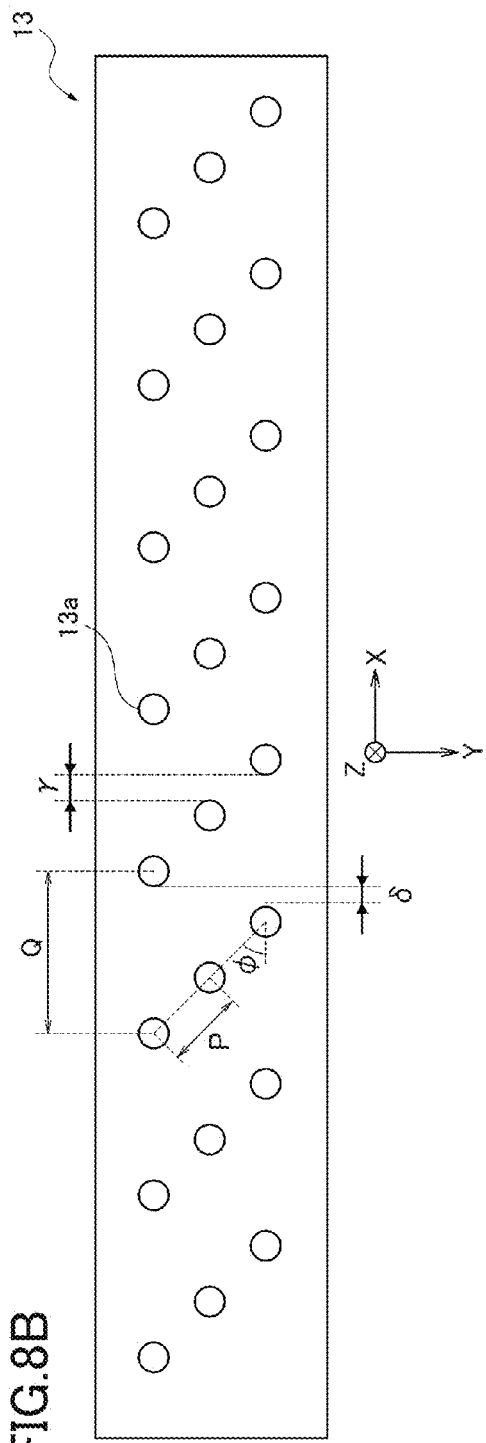

DIRECTION OF UNEVENNESS

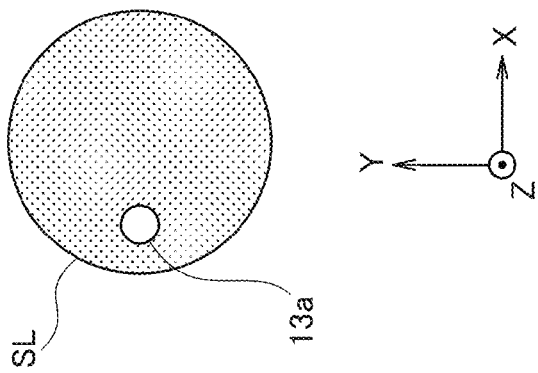
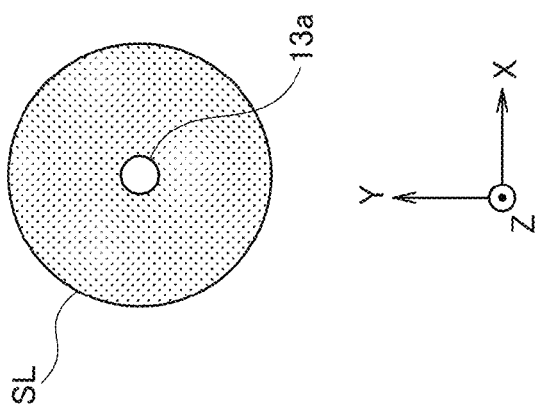
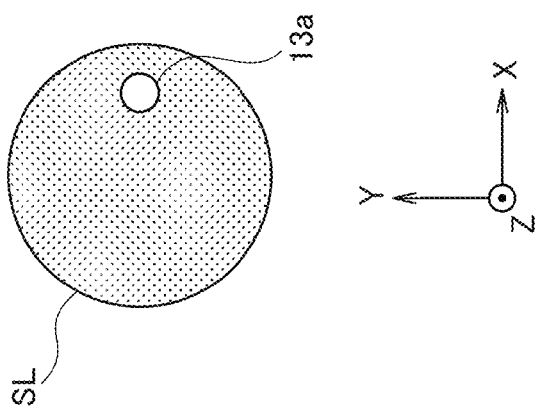

MEASURE POSITION IN TOTAL IMAGE WIDTH

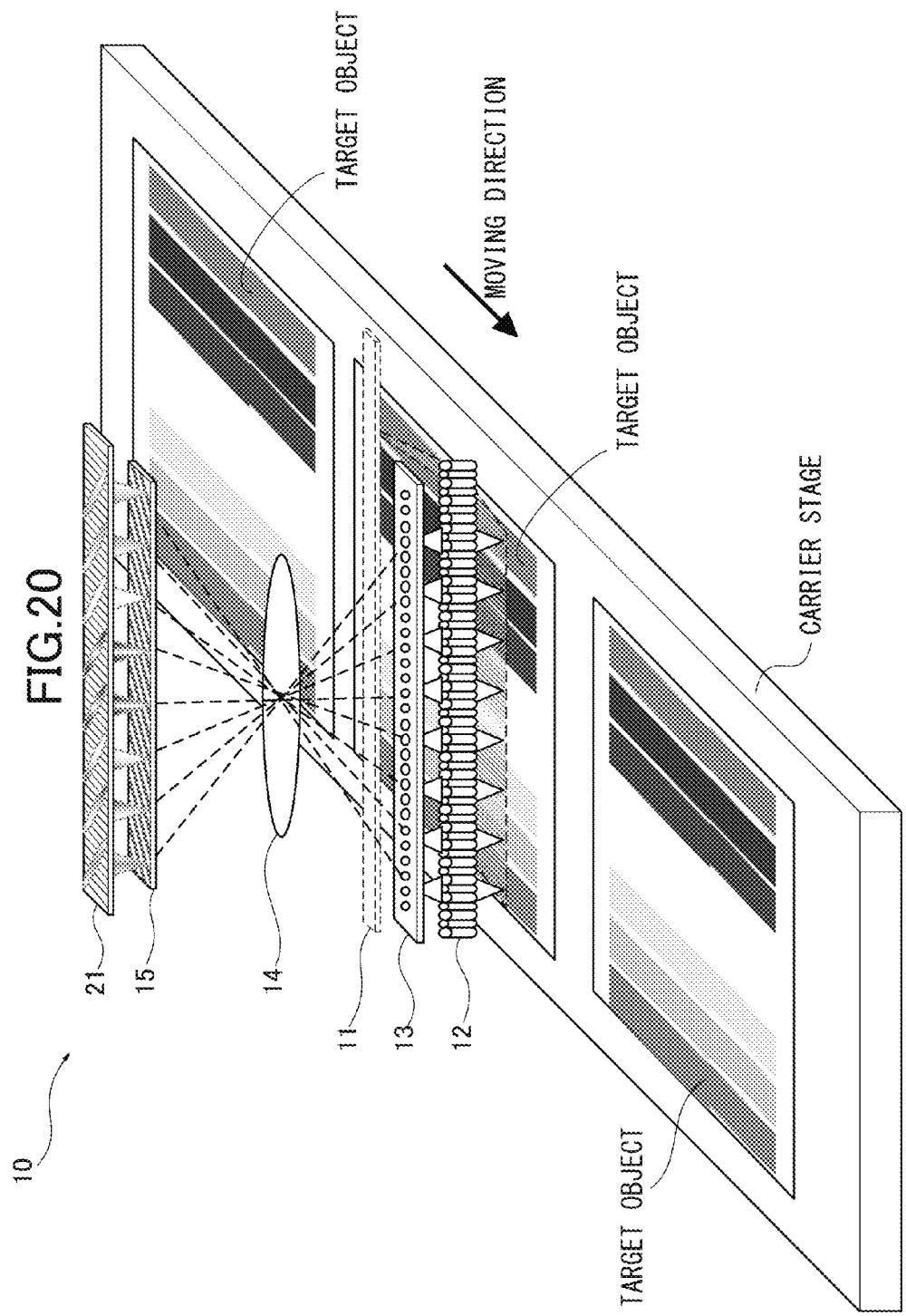

US 8,964,176 B2

SPECTROMETER, AND IMAGE EVALUATING UNIT AND IMAGE FORMING DEVICE INCORPORATING THE SAME

CROSS REFERENCE TO RELATED APPLICATION

The present application is based on and claims priority from Japanese Patent Application No. 2012-52478, filed on Mar. 9, 2012, the disclosure of which is hereby incorporated by reference in its entirety.

BACKGROUND OF THE INVENTION

Field of the Invention

The present invention relates to a spectrometer to measure wavelength spectrum, and an image evaluating unit and an image forming device incorporating the same.

In related art a spectrometer is known. Japanese Unexamined Patent Publication No. 2008-518218, for example, discloses a spectrometer which projects light beams from light sources to a target object through collimator lenses and a slit diaphragm, and receives reflected beams with a line sensor via a linear optical array and a color filter to measure the wavelength spectrum of the reflected light.

Such a spectrometer faces a problem that it cannot accurately measure the wavelength spectrum of reflected light by a target object due to the occurrence of crosstalk among the optical sensors of the line sensor.

SUMMARY OF THE INVENTION

The present invention aims to provide a spectrometer which can accurately measure the wavelength spectrum of reflected light by a target object without occurrence of crosstalk.

According to one aspect of the present invention, a spectrometer includes a light source to project a light beam to a target object, an optical element with a plurality of apertures through which the light beam reflected by the target object transmits, a diffraction element to form diffracted images from a plurality of light beams having transmitted through the optical element; and a light receiving element to receive the diffracted images formed by the diffraction element and including an optical shield to block a diffracted image other than a certain-order diffracted image.

BRIEF DESCRIPTION OF THE DRAWINGS

Features, embodiments, and advantages of the present invention will become apparent from the following detailed description with reference to the accompanying drawings:

FIG. 1 schematically shows the structure of an image forming device according to one embodiment of the present invention by way of example;

FIG. 2 shows an optical scanner of the imaging forming device in FIG. 1;

FIG. 4 shows the optical scanner in FIG. 2;

FIG. 8A shows a micro lens array and FIG. 8B shows an optical element;

FIGS. 16A to 16C show a positional relation between a lens SL and an aperture;

FIG. 20 shows an example of the structure of an image evaluating unit by way of example.

DETAILED DESCRIPTION OF PREFERRED EMBODIMENTS

Figure 3A:
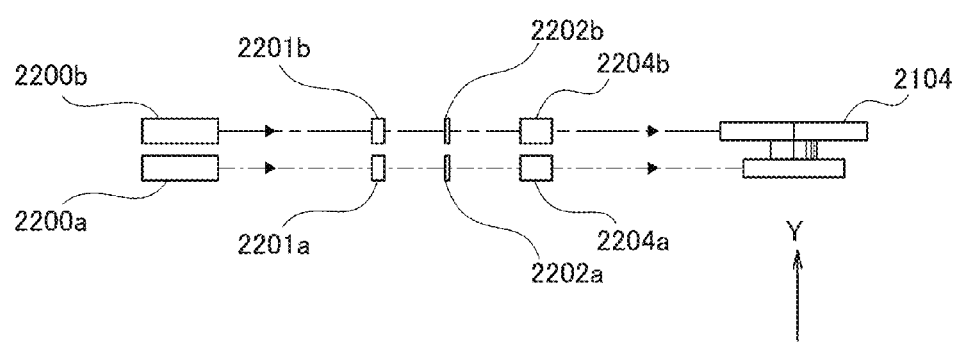
FIGS. 3A, 3B show the optical scanner in FIG. 2.

Hereinafter, one embodiment of the present invention will be described in detail with reference to FIG. 1 to FIG. 14. Wherever possible, the same reference numbers will be used throughout the drawings to refer to the same or like parts.

FIG. 1 schematically shows the structure of an image forming device 2000 according to one embodiment by way of example. The image forming device 2000 is a tandem type, full color image forming device and includes an optical scanner 2010, four photoreceptor drums 2030a to 2030d, four cleaning units 2031a to 2031d, four charging units 2032a to 2032d, four develop rollers 2033a to 2033d, four toner cartridges 2034a to 2034d, a transfer belt 2040, a transfer roller 2042, a fuser unit 2050, a feed roller 2054, a resist roller pair 2056, a discharge roller 2058, a paper tray 2060, a discharge tray 2070, a communication controller 2080, an image quality detector 2245, a not-shown hygrothermal sensor, and a controller 2090 to control these elements.

Note that herein, a longitudinal direction of the photoreceptor drums is defined to be X axis and a direction in which the photoreceptor drums are arranged is defined to be Z axis in an XYZ three-dimensional orthogonal coordinate system.

The communication controller 2080 controls a bidirectional communication with a higher-level device such as a personal computer via a network.

The controller 2090 includes a CPU, an ROM in which programs decodable by the CPU and various kinds of data used in the programs are stored, an RAM as a work memory, and an AD converter. It receives multi-color (black, cyan, magenta, yellow) image data from the higher-level device via the communication controller 2080 and transmits them to the optical scanner 2010.

The hygrothermal sensor detects the temperature and humidity of inside the image forming device 2000 and transmits them to the controller 2090.

The photoreceptor drum 2030a, charging unit 2032a, develop roller 2033a, toner cartridge 2034a, and cleaning unit 2031a constitute a station K to form black images.

The photoreceptor drum 2030b, charging unit 2032b, develop roller 2033b, toner cartridge 2034b, and cleaning unit 2031b constitute a station C to form cyan images.

The photoreceptor drum 2030c, charging unit 2032c, develop roller 2033c, toner cartridge 2034c, and cleaning unit 2031c constitute a station M to form magenta images.

The photoreceptor drum 2030d, charging unit 2032d, develop roller 2033d, toner cartridge 2034d, and cleaning unit 2031d constitute a station Y to form yellow images.

A photosensitive layer is formed on the surface of each photoreceptor drum and scanned with a light beam. Each photoreceptor drum is rotated by a not-shown rotary mechanism in a direction of the arrows in FIG. 1.

The charging units evenly charge the surfaces of the respective photoreceptor drums.

The optical scanner 2010 projects light beams modulated for the four colors to the respective photoreceptor drums according to the multi-color image data from the controller 2090. Charges disappear from the portions of the photoreceptor drum surfaces irradiated with the light beams, forming latent images thereon in accordance with the image data. The latent images are moved to the develop units along with the rotation of the photoreceptor drums.

The toner cartridges 2034a to 2034d contain black, cyan, magenta, yellow toners to supply them to the develop roller 2033a to 2033d, respectively.

The develop rollers are evenly coated with the toners from the corresponding toner cartridges. They function to visualize the latent images by attaching the toners on the surfaces of the photoreceptor drums, to form toner images. The toner images are moved to the transfer belt 2040 along with the rotation of the photoreceptor drums.

The four color toner images are transferred and superimposed in order on the transfer belt 2040 at certain timing to generate a color image.

The paper tray 2060 contains sheets of paper. The feed roller 2054 near the paper tray 2060 extracts the sheets of paper one by one from the paper tray 2060 to the resist roller pair 2056. The resist roller pair 2056 transmits them to a gap between the transfer belt 2040 and transfer roller 2042 at a certain timing. Thereby, the color image is transferred onto the sheets of paper from the transfer belt 2040, and the sheets of paper are then sent to the fuser unit 2050.

The fuser unit 2050 applies heat and pressure to them and fuses the toner thereon. Then, the sheets of paper are sent to the discharge tray 2070 via the discharge roller 2058 and accumulated.

The cleaning units remove remaining toners from the surfaces of the respective photoreceptor drums. Then, the photoreceptor drums are returned to the positions opposing the respective charging units.

The image quality detector 2245 is disposed in the vicinity of a paper carrier path after the fuser unit 2050 to detect the quality of an image on the paper. Results of the detection are transmitted to the controller 2090.

Figure 3B:
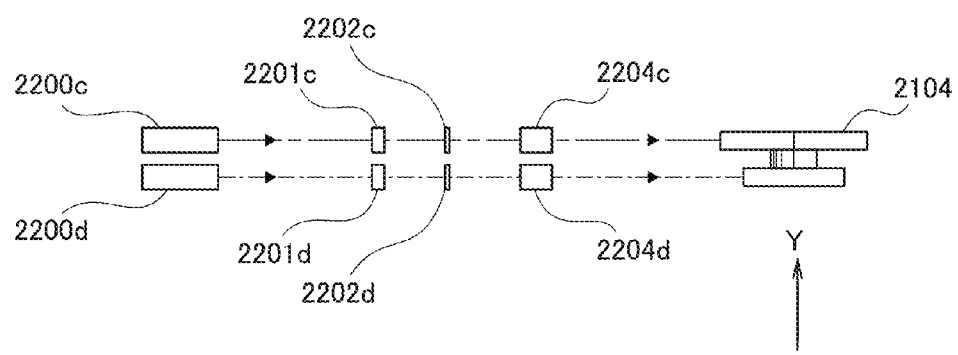

Next, the structure of the optical scanner 2010 is described. Referring to FIG. 2 to FIG. 4, by way of example, the optical scanner 2010 includes four light sources 2200a to 2200d, four coupling lenses 2201a to 2201d, four optical plates 2202a to 2202d, four cylindrical lenses 2204a to 2204d, an optical deflector 2104, four scan lenses 2105a to 2105d, six returning mirrors 2106a to 2106d, 2108b to 2108c, and a not-shown scan controller.

The light source 2200a, coupling lens 2201a, optical plate 2202a, cylindrical lens 2204a, scan lens 2105a and returning mirror 2106a function to form a latent image on the photoreceptor drum 2030a.

The light source 2200b, coupling lens 2201b, optical plates 2202b, cylindrical lens 2204b, scan lens 2105b and returning mirror 2106b function to form a latent image on the photoreceptor drum 2030b.

The light source 2200c, coupling lens 2201c, optical plate 2202c, cylindrical lens 2204c, scan lens 2105c and returning mirror 2106c function to form a latent image on the photoreceptor drum 2030c.

The light source 2200d, coupling lens 2201d, optical plate 2202d, cylindrical lens 2204d, scan lens 2105d and returning mirror 2106d function to form a latent image on the photoreceptor drum 2030d.

The coupling lenses are placed on the paths of light beams from the respective light sources to convert them to parallel beams. The optical plates each include apertures to adjust the shapes of the beams from the coupling lenses. The cylindrical lenses image the light beams having passed through the apertures of the optical plates near the reflective surface of the optical deflector 2104 along Y axis.

The optical deflector 2104 has two-stage polygon mirrors each with four deflection surfaces. A lower-stage polygon mirror deflects the light beams from the cylindrical lenses 2204a and 2204d while an upper-stage polygon mirror deflects the light beams from the cylindrical lenses 2204b and 2204c. The two-stage polygon mirrors are rotated with a phase shift by 45 degrees from each other and scan the light beams alternatively.

The photoreceptor drum 2030a is irradiated with the light beam deflected by the optical reflector 2104 from the cylindrical lens 2204a via the scan lens 2105a and returning mirror 2106a, forming optical spots thereon. The optical spots are moved along the length of the photoreceptor drum 2030a by the rotation of the optical deflector 2104.

Likewise, the photoreceptor drum 2030b is irradiated with the light beam by the optical reflector 2104 from the cylindrical lens 2204b via the scan lens 2105b and two returning mirrors 2106b, 2108b, forming optical spots thereon. The optical spots are moved along the length of the photoreceptor drum 2030b by the rotation of the optical deflector 2104.

The photoreceptor drum 2030c is irradiated with the light beam by the optical reflector 2104 from the cylindrical lens 2204c via the scan lens 2105c and two returning mirror 2106c, 2108c, forming optical spots thereon. The optical spots are moved along the length of the photoreceptor drum 2030c by the rotation of the optical deflector 2104.

The photoreceptor drum 2030d is irradiated with the light beam by the optical reflector 2104 from the cylindrical lens 2204d via the scan lens 2105d and returning mirror 2106d, forming optical spots thereon. The optical spots are moved along the length of the photoreceptor drum 2030d by the rotation of the optical deflector 2104.

The direction in which the optical spots are moved on the photoreceptor drums is main scan direction while the rotary direction of the photoreceptor drums is sub scan direction.

The optical system placed on the optical path between the optical deflector 2104 and each photoreceptor drum is referred to as scan optical system.

Figure 5:
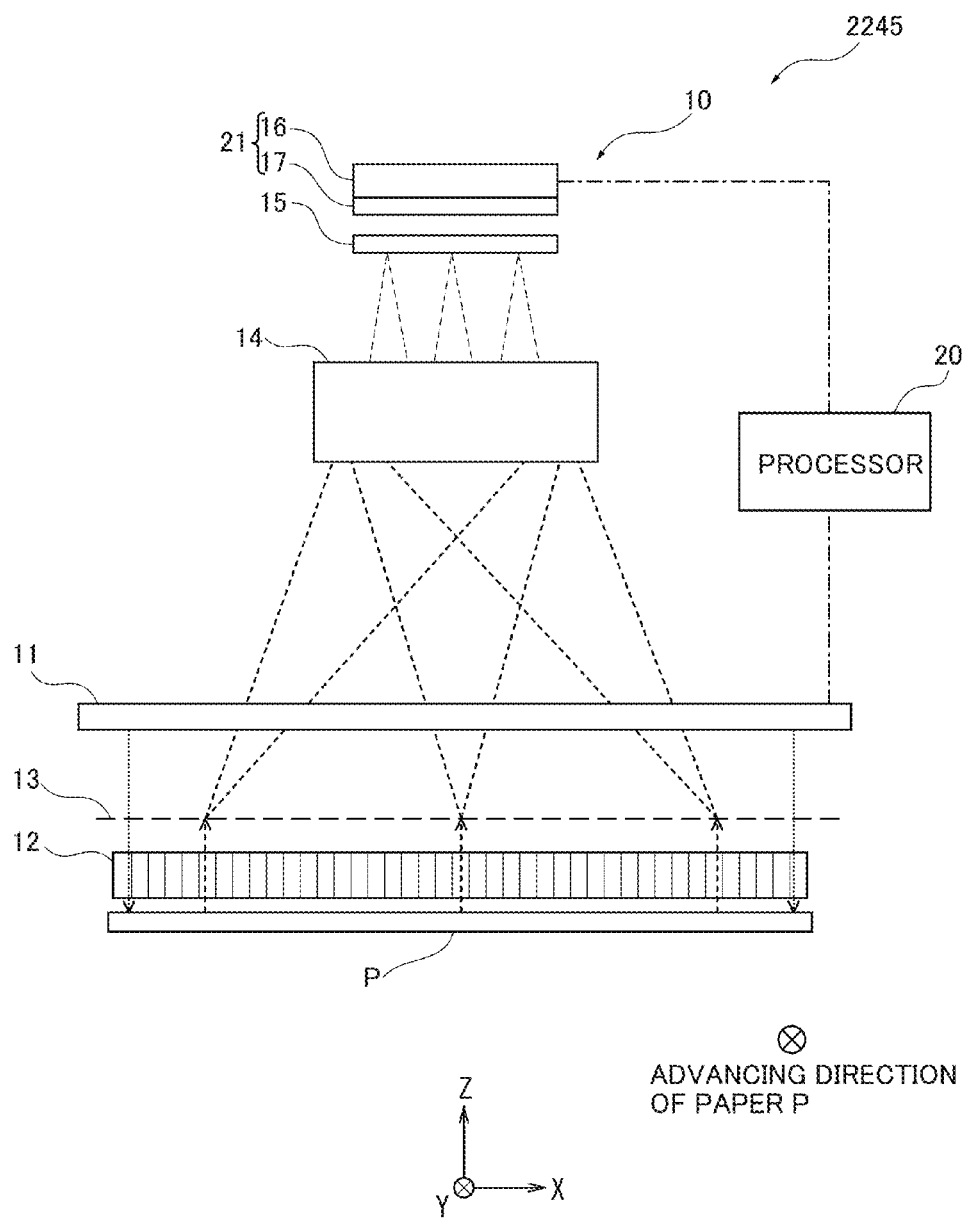
FIG. 5 shows an example of image quality detector according to one embodiment of the present invention.

FIG. 5 shows an example of the image quality detector 2245. It includes a spectrometer 10 and a processor 20. A toner image is fused on the surface (+Z side) of a paper P.

The spectrometer 10 is placed on +Z side of the paper P and includes a light source unit 11, a micro lens array 12, an optical element 13, an imaging system 14 as imaging element, a diffraction element 15, and a light receiving element 21.

The operation of the spectrometer 10 is as follows. First, the surface of the paper P is irradiated with a light beam from the light source unit 11. The light beam reflected by the paper P is imaged on the micro lens array 12, transmits through the optical element 13, and is imaged by the imaging system and incident on the diffraction element 15. Diffracted by the diffraction element 15, a diffracted image is generated from the light beam, and received by the light receiving element 21.

Figure 6:
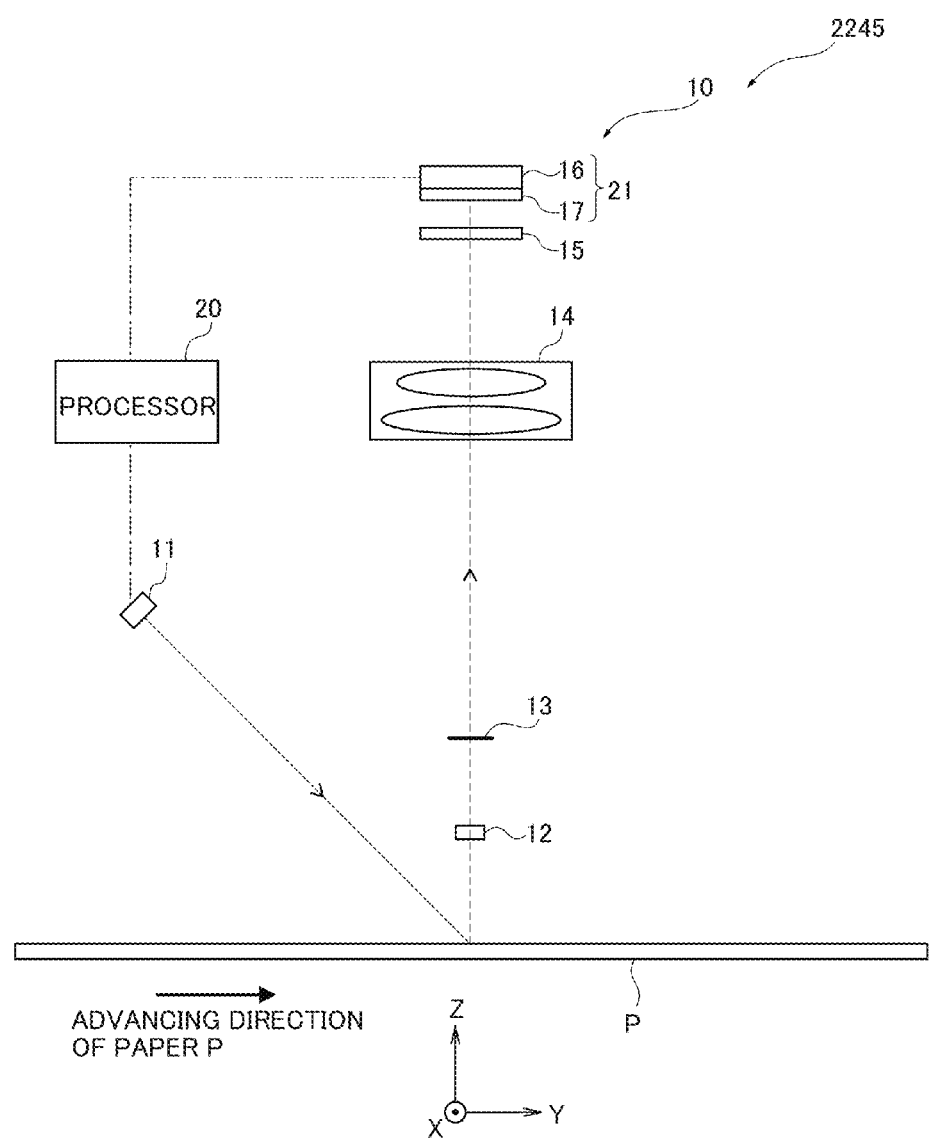
FIG. 6 shows the image quality detector in FIG. 5.

The structure of the spectrometer 10 is described referring to FIG. 6 by way of example. The light source unit 11 is disposed on −Y axis side separately from the micro lens array 12, optical element 13, imaging system 14, diffraction element 15, and light receiving element.

Figure 7A:
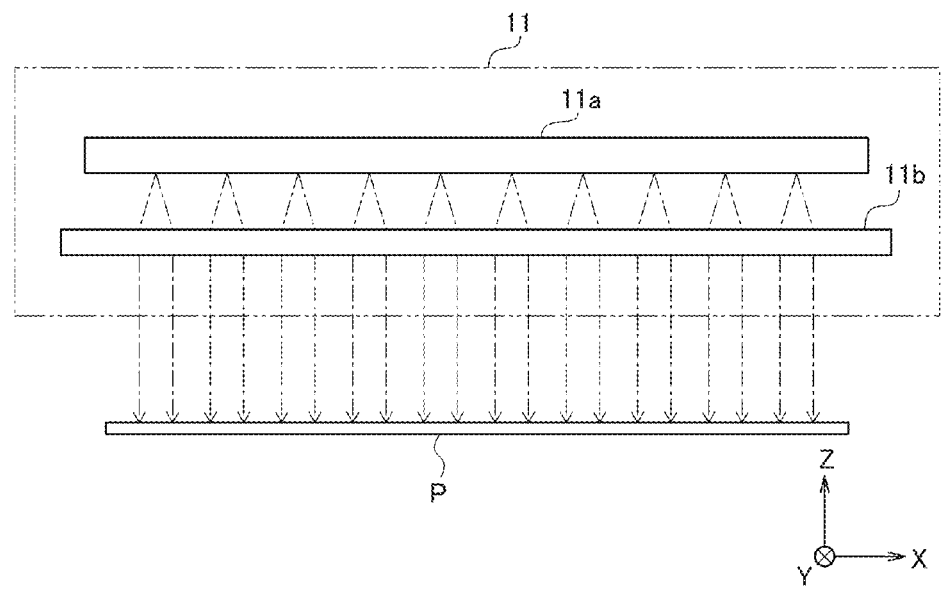
FIGS. 7A, 7B show a light source unit.
Figure 7B:
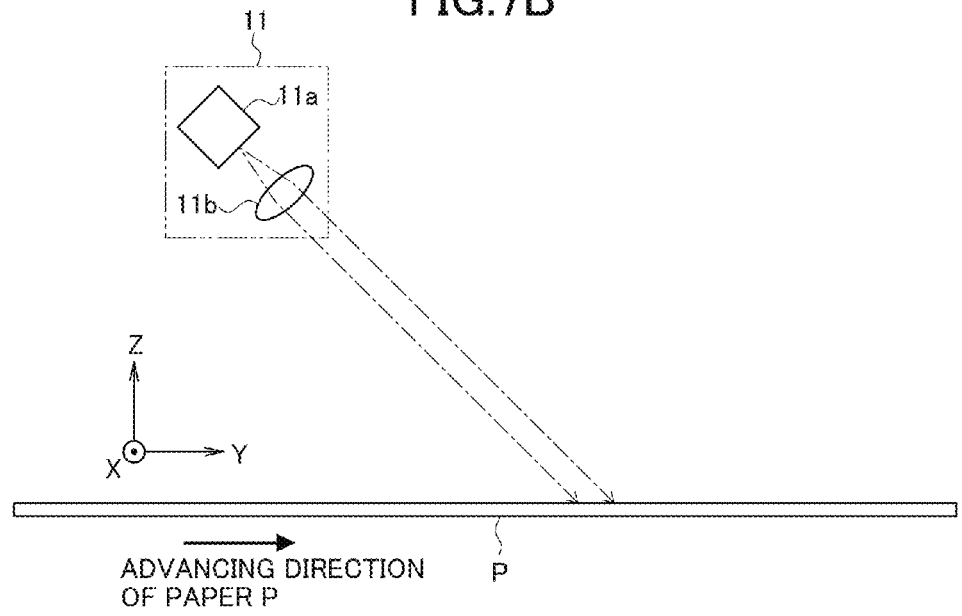
Figure 9:
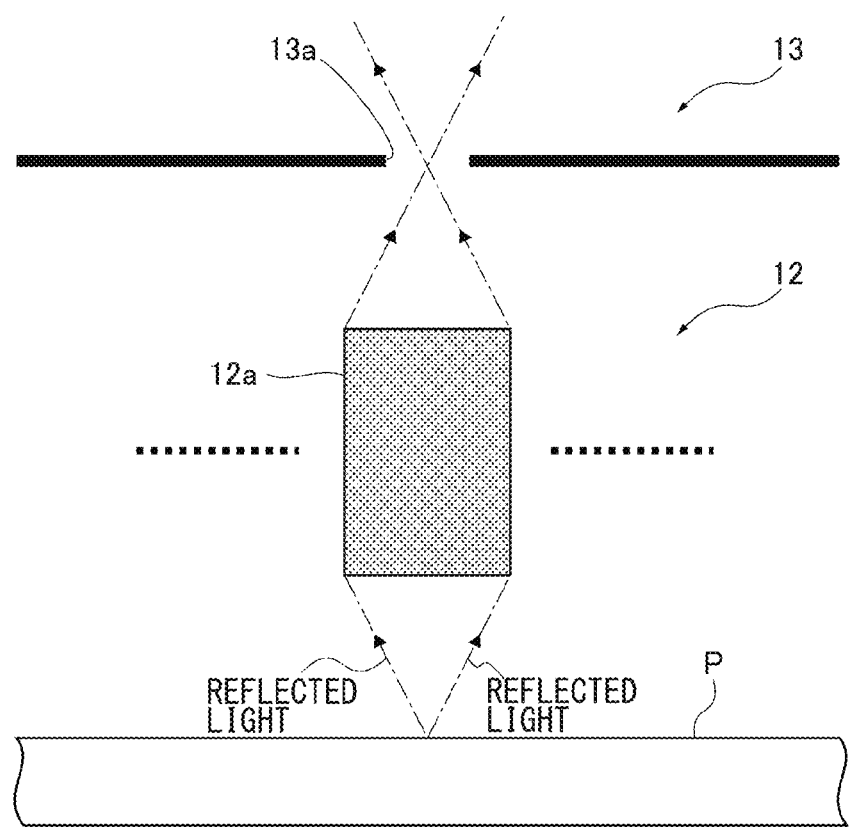
FIG. 9 shows a positional relation between the micro lens array and optical element.

The light source unit 11 includes, for example an LED array 11a and a collimate lens array 11b as shown in FIGS. 7A, 7B.

The LED array 11a includes light emitting devices (LED) arranged along X axis. Each LED emits white light with intensity in almost the entire visible light range, and is controlled to turn on and off by the processor 20.

In replace of the LED array, a fluorescent lamp as a cold-cathode tube or other lamps can be used. It is preferable for a light source to emit light in a wavelength range necessary for spectroscopy and be able to evenly illuminate the entire target area.

The collimate lens array 11b includes collimate lenses in association with the LEDs. They are arranged on the optical paths from the LEDs, respectively to convert the white light to a parallel light which illuminates the surface of the paper P. That is, the light source unit 11 projects a linear light beam whose longitudinal direction is along X axis.

The white light from the light source unit 11 is set to be obliquely incident on the paper P in YZ plane in FIG. 7B. Herein, the light diffusely reflected by the surface of the paper P is referred to as reflected light.

Returning to FIG. 5, the micro lens array 12 is placed on +Z side of the paper P, and it includes micro lenses 12a in FIG. 8A.

The micro lenses 12a are substantially the same and two-dimensionally arranged in a plane parallel to XY plane so that their optical axes are parallel to Z axis and their centers comes at different positions.

Specifically, in the micro lens array 12 three micro lenses 12a, for example, are arranged with constant interval in a $D_\phi$ direction making an angle $\phi$ (sharp angle for instance) with X axis in the plane parallel to XY plane, forming a column. Eight columns, for example, are arranged with constant interval along X axis. The two neighboring columns are disposed with an interval c in FIG. 8A not to overlap each other along X axis and Y axis.

Of the reflected light, a light incident on the micro lenses 12a is converted to a convergent light and projected to +Z axis.

The optical element 13 is disposed on +Z side of the micro lens array 12 in FIG. 5 and includes, for example, 24 apertures 13a arranged to correspond to the micro lenses 12a. That is, the apertures 13a are positioned in the vicinity of the light converging positions of the corresponding micro lenses 12a in FIG. 9. The apertures 13a are circular pinholes in the same size or diameter by way of example.

Specifically, the apertures 13a are two-dimensionally arranged at different positions along X axis in a plane parallel to XY plane. That is, they are arranged not to overlap each other with intervals $\gamma$, $\delta$ in FIG. 8B along Y axis and X axis.

In the optical element 13, three apertures, for example, are arranged with constant interval in a direction parallel to the $D_\phi$ direction in the plane parallel to XY plane, forming a column. Eight columns, for example are arranged with constant interval along X axis. The two neighboring columns are disposed with an interval $\delta$ in FIG. 8B not to overlap each other along X axis and Y axis. The distance between the centers of the two neighboring apertures 13a in each column is set to the same length P as that of the two neighboring micro lenses 12a. The distance between the centers of the two neighboring apertures 13a along X axis is set to the same length Q as that of the two neighboring micro lenses 12a.

The light having transmitted through the micro lenses 12a are incident on the corresponding apertures 13a and converged.

Note that each aperture can be a slit. The shape of the apertures should not be limited to be circular and can be polygonal, ellipsoidal, rectangular or the like.

Further, the optical element can be a blackened metal plate with through apertures or a glass plate which is coated with a black material of a certain shape such as chrome, carbon-containing resin.

In FIG. 6 the imaging system 14 is disposed on +Z side of the optical element 13 to receive the light beams from the apertures 13a. It is comprised of two convergent lenses, for example, arranged along the Z axis to convert the light beams from the apertures 13a to convergent light. The imaging system 14 has an image-space telecentric optical property, for example. The optical paths therefrom are approximately parallel to the optical axis or Z axis in FIG. 5.

Figure 11A:
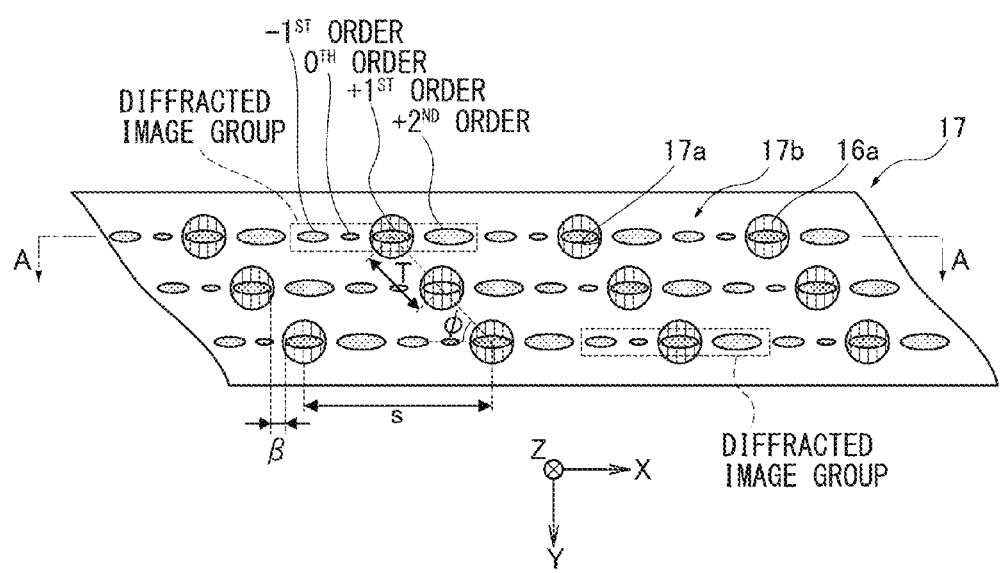
FIG. 11A shows the incidence positions of diffracted images on the mask element and FIG. 11B is a cross section view of the same along the A to A line in FIG. 11A.
Figure 11B:
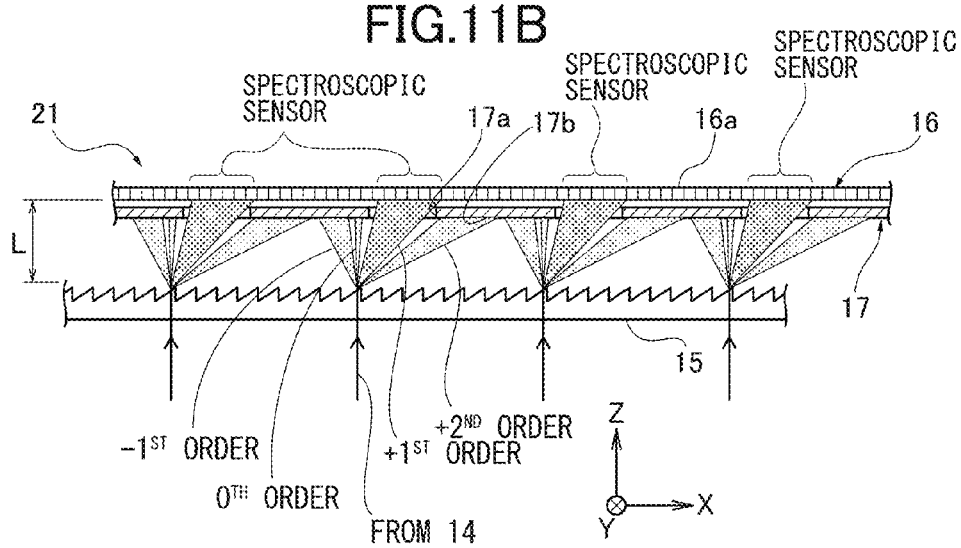

The diffraction element 15 in FIG. 5 is disposed on the +Z side of the imaging system 14, and it is a grating as a transparent plate of which sawtooth unevenness is formed on the surface, as shown in FIG. 11B. A direction of the sawteeth is parallel to X axis in FIG. 13A.

The diffraction angle $\theta m$ of the diffraction element 15 is expressed by the following equation:

$$\sin \theta m = m\lambda/p + \sin \alpha$$

where p is a grating pitch as a distance between the centers of two neighboring sawteeth, $\alpha$ is an incidence angle of reflected light on the diffraction element 15, and $\lambda$ is a wavelength of light contained in the reflected light. The light with the wavelength $\lambda$ is diffracted at the angle $\theta m$.

The sawtooth grating can increase the optical intensity of $+1^{st}$ order diffracted images. The unevenness of grating can be stepwise.

The light from the system 14 is incident on the diffraction element 15 at the angle $\alpha$ of 0° and diffracted and travels in different directions depending on a wavelength. Thus, the reflected light is dispersed according to wavelengths by the diffraction element 15, forming $-1^{st}$ order diffracted image, $0^{th}$ order diffracted image, $+1^{st}$ order diffracted image and $+2^{nd}$ order diffracted image for example.

The light receiving element 21 includes a mask element 17 and a linear sensor 16.

The mask element 17 in FIG. 5 is placed on the +Z side of the diffraction element 15 to receive the $-1^{st}$ order diffracted image, $0^{th}$ order diffracted image, $+1^{st}$ order diffracted image and $+2^{nd}$ order diffracted image of the reflected light.

Figure 10A:
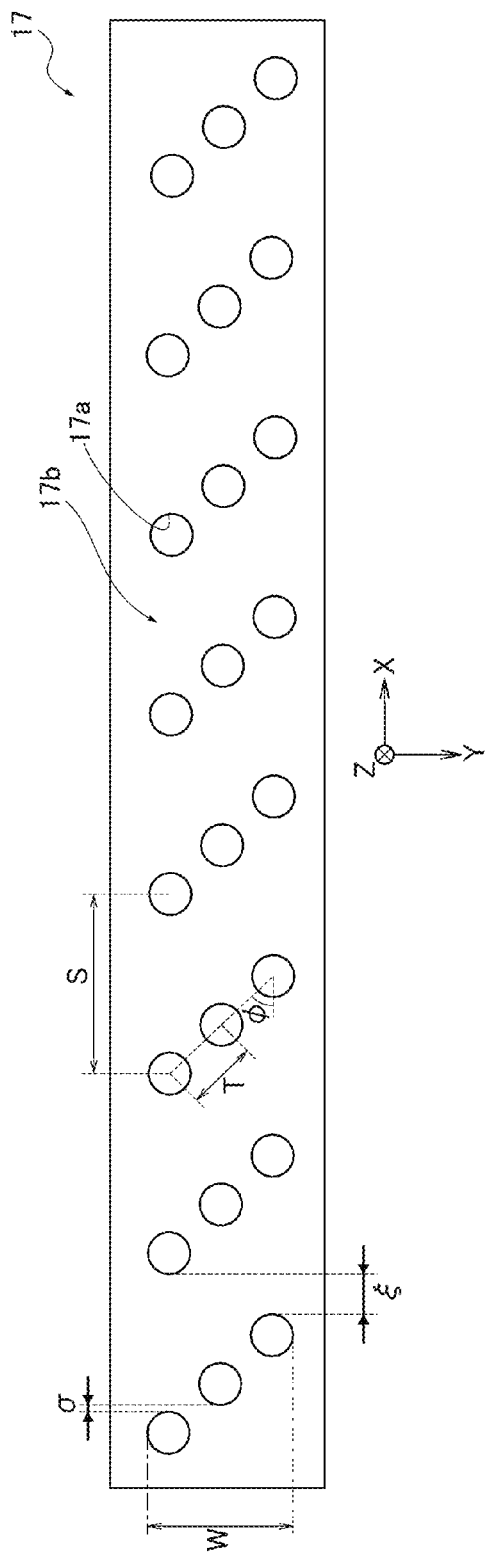
FIG. 10A shows a mask element and FIG. 10B shows a linear sensor.

The mask element 17 is a plate such as a blackened metal plate parallel to XY plane, and includes apertures 17a and an optical shield 17b as shown in FIGS. 5, 10A. By use of such a mask element 17 having the apertures 17a and optical shield 17b, the linear sensor 16 can receive only the diffracted images in a certain order and unnecessary light or diffracted images in order other than the certain order are blocked by the optical shield. In the following the certain order is $+1^{st}$ order and the other orders are $-1^{st}$, $0^{th}$, and $+2^{nd}$ orders.

For instance, 24 apertures 17a are arranged in association with the 24 apertures 13a of the optical element 13 and are of the same size or diameter. They are two-dimensionally arranged at different positions along X axis with intervals σ, ξ on the plane parallel to the XY plane in FIG. 10A.

Specifically, in the mask element 17 three apertures 17a, for example, are arranged with constant interval in a parallel direction to the $D_\varphi$ direction, forming a column. Eight columns, for example are arranged with constant interval along X axis. The two neighboring columns are disposed at different positions along X axis with an interval ξ in FIG. 10A.

Figure 13A:
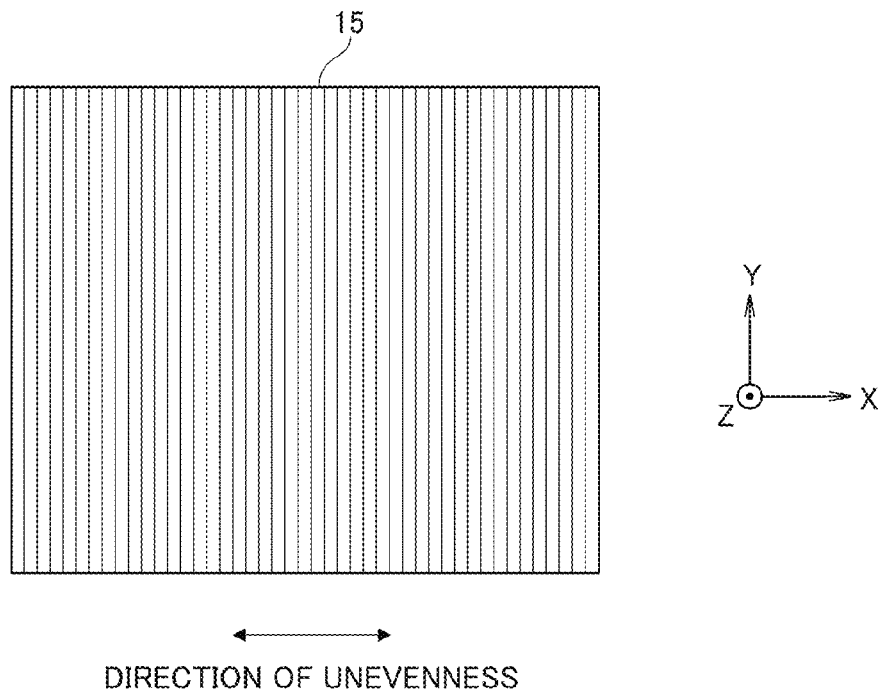
FIG. 13A shows a direction of unevenness in the diffraction element.
Figure 13B:
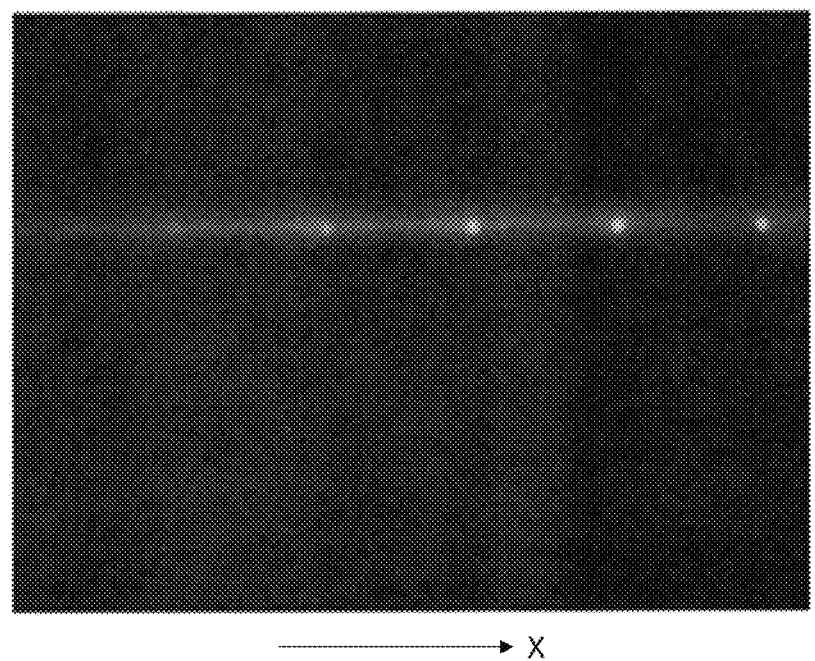
FIG. 13B shows crosstalk among spectroscopic sensors.

Since the sawtooth grating of the diffraction element 15 is parallel to X axis as shown in FIG. 13A, the $-1^{st}$, $0^{th}$, $+1^{st}$, $+2^{nd}$ order diffracted images formed by the diffraction element 15 are aligned at different diffraction angles along the XZ plane in FIG. 11B. These diffracted images are different from each other in the position on X axis and the X-axis width of a cross section along a certain plane parallel to XY plane.

The positions and size of the apertures 17a are set so that only the $+1^{st}$ order diffracted images formed from the light via the imaging system 14 and apertures 13a are incident on the diffraction element 15.

Specifically, the incidence position of light from each aperture 13a on the diffraction element 15 can be found from the position of each aperture 13a and the reduction rate of the imaging system 14. Then, the incidence position of the $+1^{st}$ order diffracted image on the linear sensor 16 can be found by obtaining the diffraction angle $\theta_{+1}$ of this image of light from the aperture 13a by the above-described equation. Thus, the position of the aperture 17a relative to the aperture 13a can be determined according to the incidence position on the linear sensor. In the present embodiment α=0° so that $\theta_{+1}=\lambda/P$.

Further, the length of the $+1^{st}$ order diffracted image on the linear sensor 16 can be found from a distance L between the diffraction element 15 and linear sensor 16 and the diffraction angle $\theta_{+1}$. The size of the apertures 17a can be determined on the basis of this length.

The optical shield 17b is a portion of the mask element 17 except for the apertures 17a or an area surrounding the 24 apertures 17a, on which $-1^{st}$, $0^{th}$, and $+2^{nd}$ diffracted images among the diffracted images formed by the diffraction element 15 are incident.

Four diffracted images, for example are formed from the light having transmitted through the apertures 13a and imaging system 14 and incident on the $+2^{nd}$, $+1^{st}$, $+0^{th}$, $-1^{st}$ mask element 17 in FIG. 11A. The four diffracted images order or a diffracted image group are aligned along X axis in this order.

Although only four diffracted images are shown in FIG. 11A, 8 diffracted images are aligned along X axis with constant interval, forming a group. Three groups of diffracted images, that is, the same-order diffracted images are arranged in the direction parallel to the $D_\varphi$ direction. The three $+1^{st}$ order diffracted images aligned in the parallel direction are, for example, at different positions relative to X axis by β in FIG. 11A.

In the present embodiment the distance between the centers of the two neighboring apertures 17a along X axis is set to be equal to that S between the centers of the two $+1^{st}$ diffracted images of the two neighboring groups along X axis. Likewise, the distance between the centers of the two neighboring apertures 17a in the $D_\varphi$ direction is set to be equal to that T between the centers of the two neighboring $+1^{st}$ diffracted images in the direction parallel to the $D_\varphi$ direction. The size of each aperture 17a is set to be slightly larger than that of a XY cross section of the $+1^{st}$ diffracted image at an incidence position on the mask element 17.

As a result, the mask element 17 can transmit $+1^{st}$ diffracted images and block diffracted images in orders other than the $+1^{st}$ order including $0^{th}$ order.

Figure 10B:
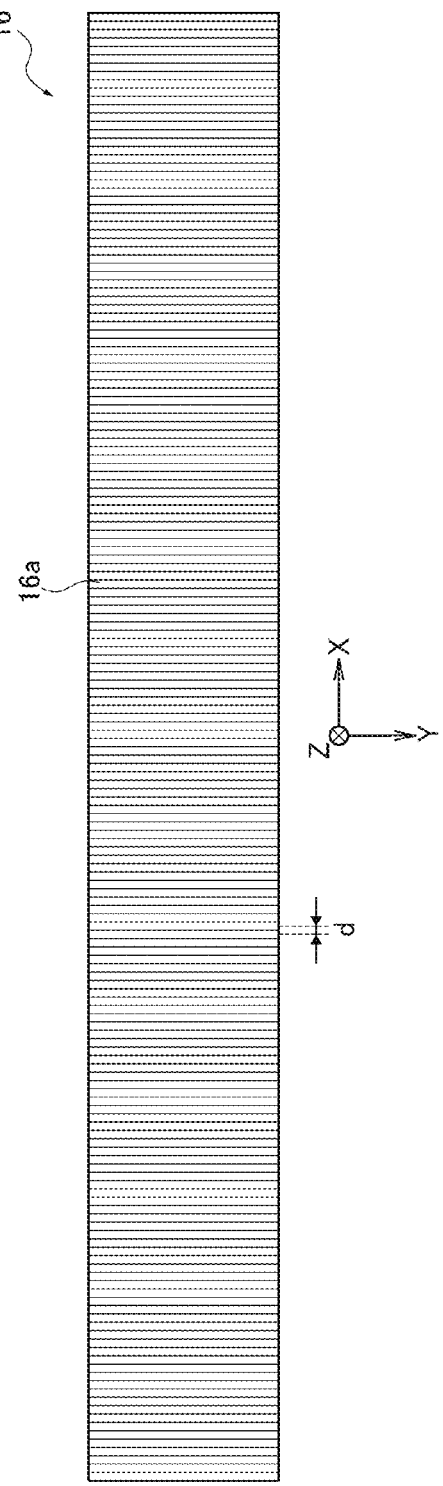

The linear sensor 16 is mounted on the +Z surface of the mask element 17 in FIG. 5 and includes, for example, pixels 16a closely arranged along X axis in FIG. 10B at a pitch d. Each pixel 16a outputs a signal to the processor 20 in accordance with a light receiving amount.

The pixels 16a are of a rectangular shape which is long along Y axis, and the length thereof is longer than the width W of the column of the apertures 17a along Y axis (FIG. 10A).

The linear sensor 16 includes, for example, six pixels 16a and 24 spectroscopic sensors arranged along X axis. The spectroscopic sensors correspond with the apertures 17a in FIGS. 11, 12 and are disposed on the +Z side of the apertures 17a. The twenty-four $+1^{st}$ diffracted images having passed through the apertures 17a are received at different spectroscopic sensors according to each wavelength spectrum.

Figure 12:
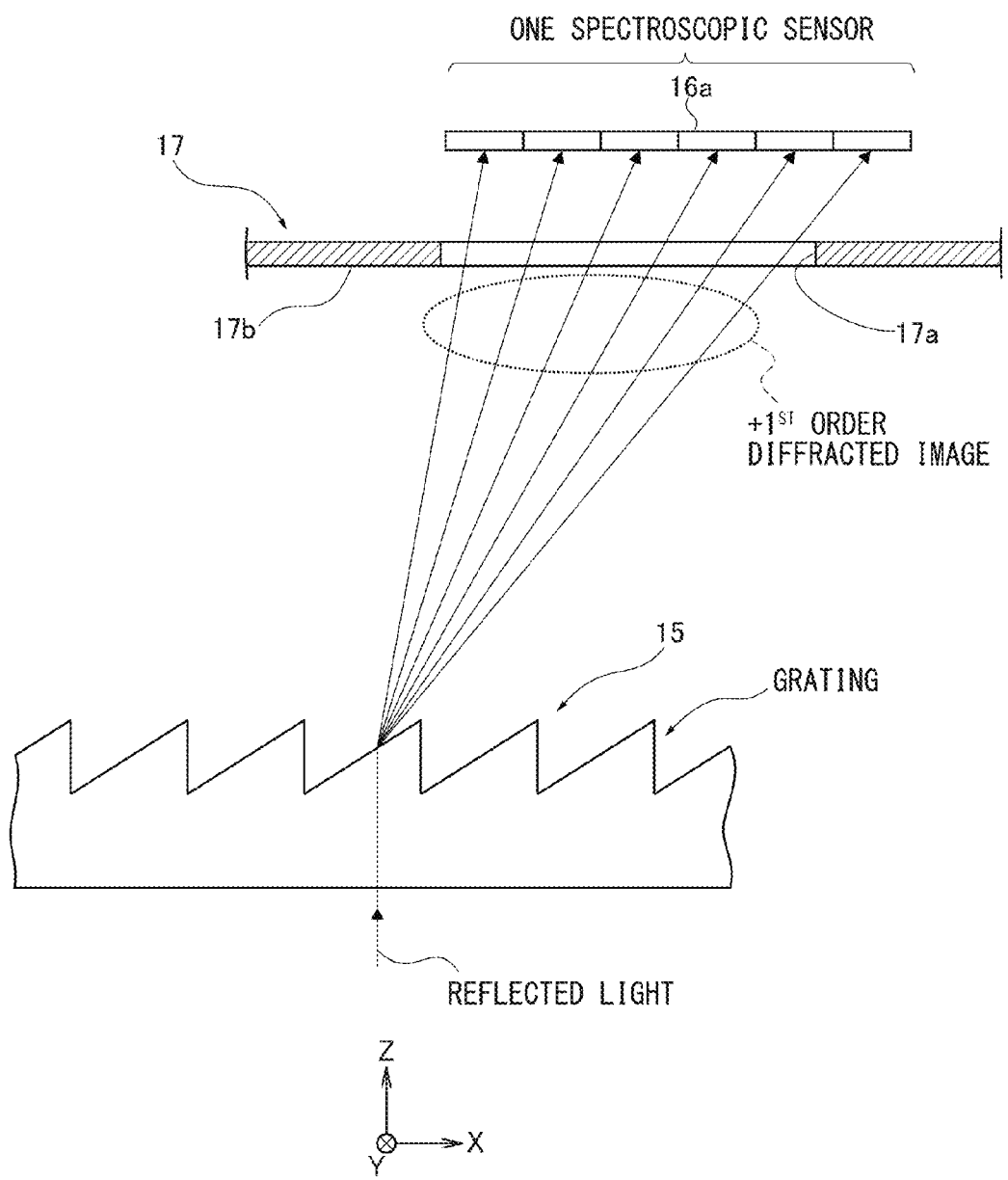
FIG. 12 shows the spectral wavelength of a diffraction element.

Specifically, if the pixel pitch d of the linear sensor is 10 μm, the pitch p of the diffraction grating of the diffraction element 15 is 10 μm, and the distance L between the diffraction element 15 and linear sensor 16 is 2 mm in FIG. 11B, the $+1^{st}$ order diffracted image is received at the six pixels 16a according to wavelengths, as shown in FIG. 12 by way of example.

Thus, the spectroscopic sensors individually receive only the $+1^{st}$ order diffracted images having transmitted through different apertures 13a. The size of the $+1^{st}$ order diffracted image at each spectroscopic sensor is adjustable by changing the size of the apertures 13a, the diffraction angle $\theta_{+1}$ of the $+1^{st}$ diffracted image, and the position of the linear sensor 16.

In the following a wavelength range of a $+1^{st}$ order diffracted image received at a single pixel is referred to as a band and dispersing the $+1^{st}$ order diffracted image into different bands is referred to as multiple-band dispersion. A relation between the wavelength and optical intensity or reflection rate of the reflected light is referred to as reflected light wavelength spectrum.

In the multiple band dispersion, the larger the number of bands, the more accurate wavelength spectrum of reflected light can be obtained. However, the number of pixels of the linear sensor is unchanged, so that the number of pixels used for one spectroscopic sensor increases as the number of bands increases, reducing the number of spectroscopic sensors and the number of measure points.

In view of this, the number of bands is limited to a minimum and the processor 20 is configured to estimate the reflected light wavelength spectrum by Wiener filtering in the present embodiment. Various methods are available for estimating the reflected light wavelength spectrum, for example, disclosed in pp. 154 to 157, "Analysis and Evaluation of Digital Color Images" by University of Tokyo Press.

One example of estimation of the reflected light wavelength spectrum from an output signal of a single spectroscopic sensor is described. The spectroscopic sensor is assumed to have N pixels. A certain wavelength range as 400 to 700 nm is divided by a certain pitch as 10 nm to calculate respective reflection rates for the reflected light wavelength spectrum.

A row vector r containing each reflection rate can be expressed by the following equation:

$$r = Gv$$

where v is a row vector containing output signals vi of N pixels where i=1 to N and G is a transformation matrix.

The transformation matrix G is obtained when the squared norm of an error in R−GV is minimal, where R is a matrix [r1, r2, ..., rn] containing n row vectors (r1, r2, ..., rn) of n samples with known reflected light wavelength spectrum and V is a matrix [v1, v2, ..., vn] containing n row vectors (v1, v2, ..., vn) of the same samples measured by the spectrometer of the present embodiment.

In general a regression coefficient matrix G of V to R where V is an explanatory variable and R is an objective variable can be calculated by the following equation using Moore-Penrose pseudo inverse matrix giving the least-norm squares solution of the matrix V:

$$G=RV^T(VV^T)^{-1}$$

where T represents a transposition of matrix and −1 represents an inverse matrix. The regression coefficient matrix G obtained by the above equation is the transformation matrix G.

The transformation matrix G is calculated in advance for each spectroscopic sensor and stored in the memories of the processor 20. For each spectroscopic sensor, the processor 20 reads a transformation matrix G, creates a row vector v and integrates it with the read transformation matrix G to calculate a row vector r. Thus, the processor 20 calculates the reflected light wavelength spectrum for each spectroscopic sensor, that is, at each measure position.

Figure 14:
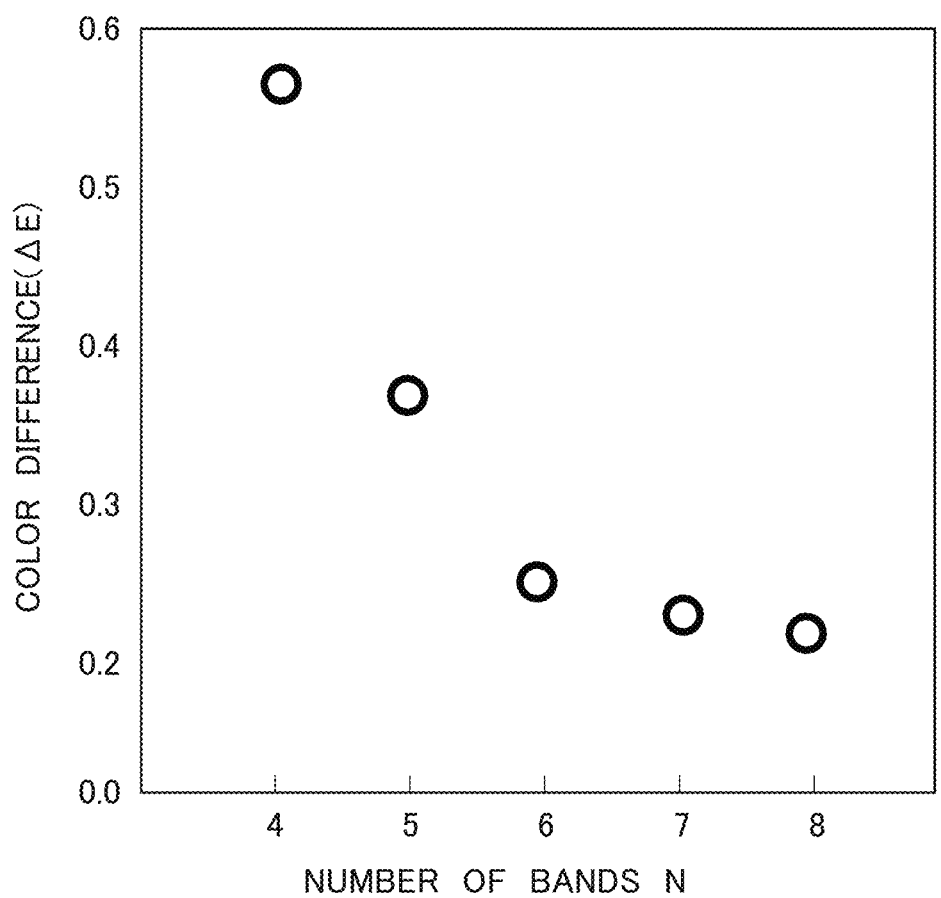
FIG. 14 is a graph showing a relation between color difference and the number of bands.

FIG. 14 is a graph showing the results of a simulation, the number N of bands and a color difference between the color from the calculated reflected light wavelength spectrum and the actual color. As shown in the graph, as the number of bands N increases, color accuracy increases although regarding the number of bands N being 6 or more, the accuracy does not change much.

With a large number of spectroscopic sensors, the processor 20 requires a large amount of time to calculate the estimation of the reflected light wavelength spectrum for each spectroscopic sensor. However, according to the spectrometer 10 in the present embodiment it is possible to adjust the number of spectroscopic sensors at a measure timing. Therefore, it can perform spectroscopy without a decrease in operability.

The controller 2090 is configured to conduct image process control when at power-on, 1) the photoreceptor drums are stopped over six hours, 2) the internal temperature of the device is changed by 10 degrees or more, or 3) the relative humidity of the device is changed by 50% or more, as well as during printing, 4) the number of prints reaches a predetermined value, 5) the rotation number of the develop roller reaches a predetermined value, or 6) the running distance of the transfer belt is a predetermined value.

The controller 2090 instructs the processor 20 to conduct spectroscopy according to an image resolution and at a good timing for image process control. For the purpose of improving operation efficiency, at power-on an importance is placed on the accuracy of spectroscopy while printing an importance is placed on the operation speed.

The controller 2090 acquires color information for each measure position on the basis of a result of the calculation of the processor 20. Wavelength spectrum data on colors are stored in the memory of the controller 2090.

Upon detection of a color variation or unevenness in a single paper sheet, the controller 2090 controls the amount of light from the light source of the optical scanner 2010. Upon detection of a color variation over two paper sheets, it controls at least any of develop bias, fuse temperature, and light amount from the light source in each scanning.

As described above, the spectrometer 10 according to the present embodiment includes the light source unit 11 to project a light beam to the paper P as a target object, an optical element 13 with apertures 13a, disposed on the paths of reflected lights by the paper P, a diffraction element 15 disposed on the paths of light beams having transmitted through the apertures 13a, the mask element 17 having the apertures 17a through which +1$^{st}$ order diffracted images individually transmit and the optical shield 17b to block diffracted images in orders other than the 1$^{st}$ order, and the linear sensor 16 including the spectroscopic sensors to receive the 1$^{st}$ order diffracted images individually.

Thus, among the diffracted images of the light beams having passed through the apertures 13a formed by the diffraction element 15, the +1$^{st}$ diffracted images pass through the corresponding apertures 17a while the −1$^{st}$, 0$^{th}$, and +2$^{nd}$ diffracted images are blocked by the optical shield 17b. The spectroscopic sensors can receive only the +1$^{st}$ diffracted images of the light beams from the respective apertures 13a.

Accordingly, it is made possible to prevent the occurrence of crosstalk over the neighboring spectroscopic sensors and to prevent the spectroscopic sensors from receiving the diffracted images of light beams from the corresponding apertures 13a in orders other than +1$^{st}$ order.

The crosstalk over the spectroscopic sensors herein signifies that at least one spectroscopic sensor receives at least one of diffracted images, 1$^{st}$, 0$^{th}$, +1$^{st}$, +2$^{nd}$ of light from the apertures 13a other than the corresponding aperture 13a. Specifically, the +1$^{st}$ diffracted image from each aperture 13a and the other order diffracted images from the apertures 13a other than the aperture in question overlap each other on the spectroscopic sensor corresponding to the aperture 13a in question (in FIG. 13B).

As a result, the spectrometer 10 can accurately measure the wavelength spectrum of reflected lights by the paper P.

Moreover, the apertures 13a are two-dimensionally arranged at different positions along the X axis in parallel to a virtual, XY plane including X axis. The apertures 17a are individually associated with the apertures 13a and two-dimensionally arranged at different positions along the X axis in parallel to the XY plane. The spectroscopic sensors are arranged along the X axis.

By use of the linear sensor 16 with the pixels 16a closely arranged on the X axis, it is possible to accurately measure the wavelength spectrum of reflected lights from points two-dimensionally arranged on the surface of the paper P.

The spectrometer 10 further includes the micro lens array 12 with the micro lenses 12a associated with the apertures 13a, disposed on the paths of reflected lights between the paper P and optical element 13. Thereby, the reflected lights by the paper P can be converged on each of the apertures 13a, increasing the intensity of light passing through the apertures 13a.

Furthermore, the spectrometer 10 includes the imaging system 14 on the paths of light beams between the optical element 13 and diffraction element 15. Thereby, the light beams from the apertures 13a can be converged on the diffraction element 15, resulting in downsizing the diffraction element 15, mask element 17, and linear sensor 16.

The imaging system 14 owns an image-space telecentric optical property. Because of this, it can equalize the diffraction angles of the +1$^{st}$ diffracted images of the light beams from the apertures 13a. This makes it possible to form the apertures 17a in the same size with constant interval along the X axis, leading to facilitating the design and manufacture of the mask element and reducing the manufacture costs.

Further, the image quality detector 2245 includes the spectrometer 10 and the processor 20, and estimates, by calculation, the wavelength spectrum of the reflected light for each measure position according to the output signal of the spectrometer 10.

The controller 2090 instructs the image quality detector 2245 to detect the quality of an image according to the resolution of a formed image and at a good timing for the image process control, and adjusts the imaging process on the basis of a result of the image quality detector 2245. Thus, the image forming device 2000 with the controller 2090 and image quality detector 2245 can generate images with a good, stable quality.

According to the present embodiment a Selfoc® lens array including gradient index lenses (hereinafter, lenses SL) two-dimensionally arranged in XY plane can be used in replace of the micro lens array 12.

Figure 15A:
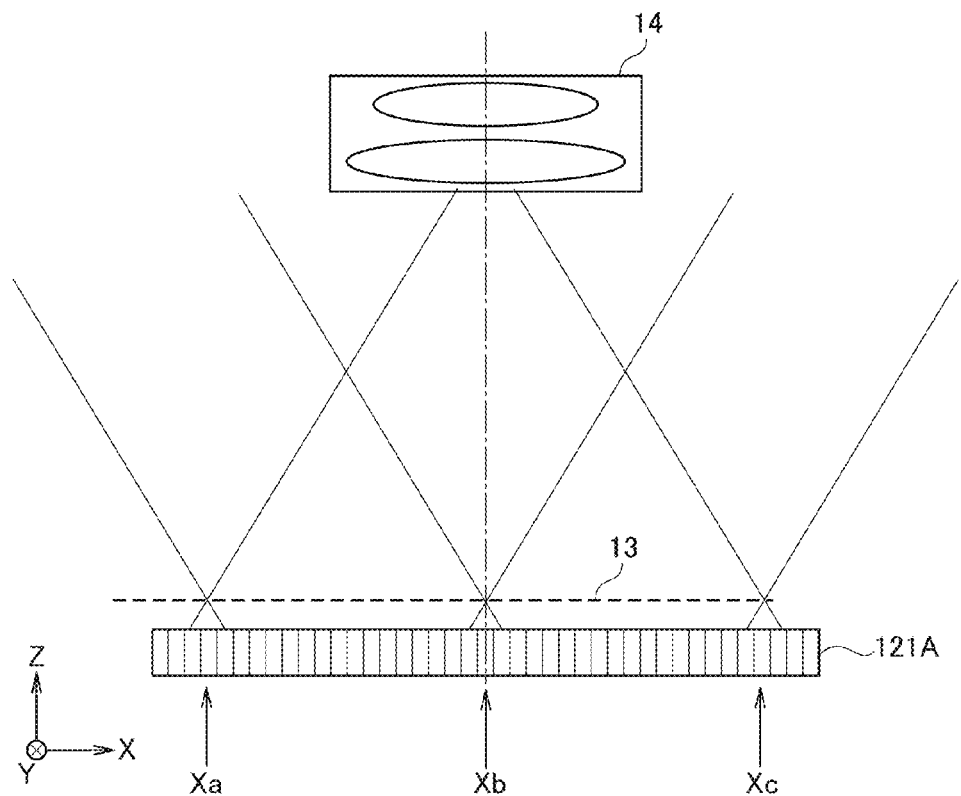
FIG. 15A shows an example of use of a Selfoc® lens array instead of the micro lens array and FIG. 15B shows measured data by using it.
Figure 15B:
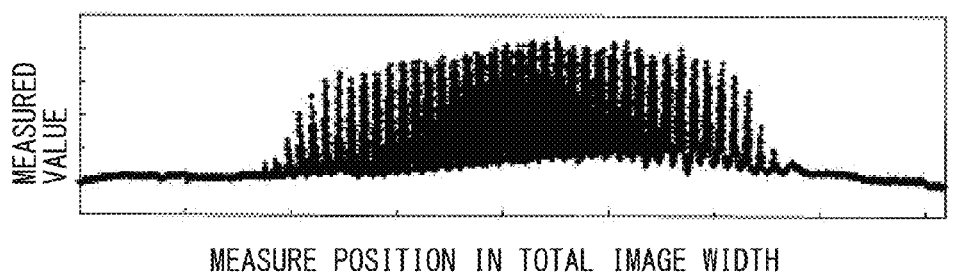

In FIG. 15A a Selfoc® lens array 121A is placed on the paths of light beams diffused by the surface of the paper P by way of example. In this case, depending on the specification, the imaging system 14 cannot capture the reflected light in the periphery area of the total width of an image due to linearity of the Selfoc® lens array 121A, as shown in FIG. 15B. Moreover, with a displacement of the centers of the lenses SL of the Selfoc® lens array and those of the apertures 13a of the optical element 13, a light amount will show light and dark distribution.

Figure 17:
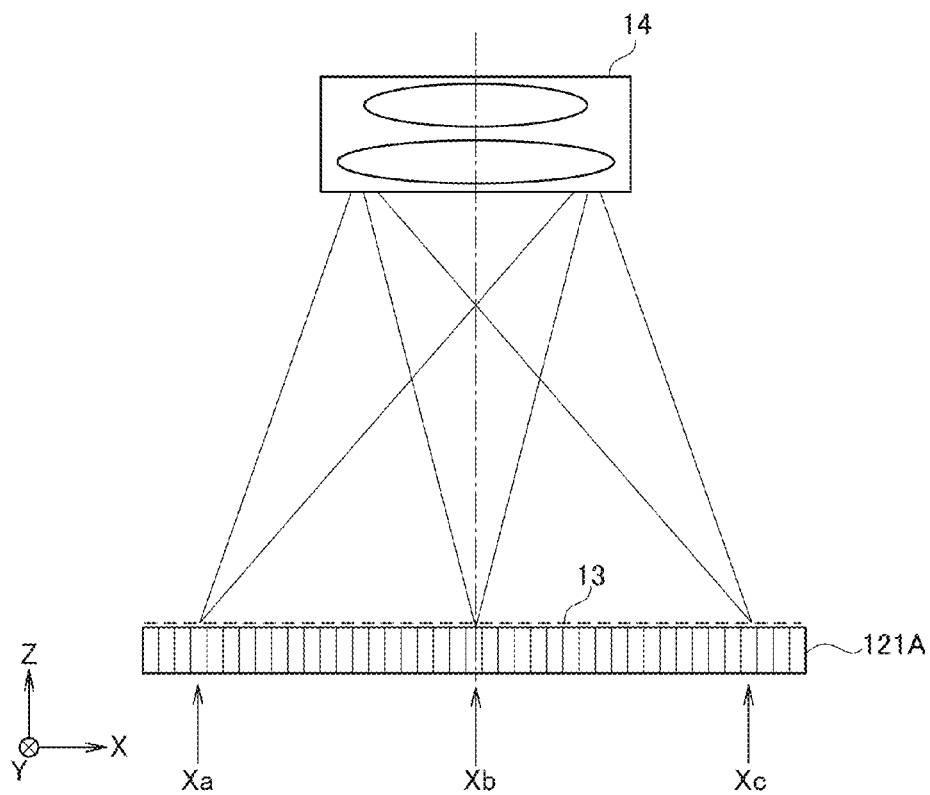
FIG. 17 shows a relation between the imaging system and the Selfoc® lens array.
Figure 18:
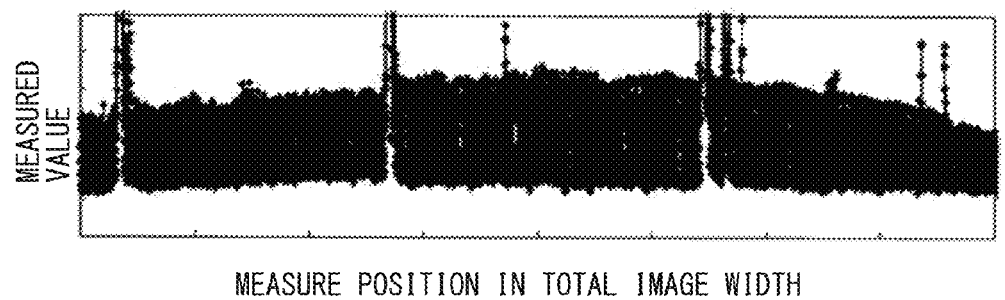
FIG. 18 shows measured data by using the system and lens array in FIG. 17.

In view of this, the lenses SL and apertures 13a are paired and the positions thereof along X axis are shifted as shown in FIGS. 16A to 16C. Thereby, the imaging system 14 can capture reflected lights by the total width of an image in FIG. 17 and the spectrometer 10 can measure the wavelength spectrum of reflected lights in the total width of an image in FIG. 18.

Specifically, with the pairs of apertures 13a and lenses SL shifted along X axis, among the reflected lights via the lenses SL, only the one having passed through the corresponding aperture 13a is incident on the imaging system 14, and diffracted by the diffraction element 15 to form diffracted images. Only the $+1^{st}$ diffracted image then passes through the corresponding aperture 17a of the mask element 17 and is received by the corresponding spectroscopic sensor of the linear sensor 16.

The shape of each lens SL and the amount of shift between the pair of lens SL and aperture 13a are determined by F-value of the imaging system 14 and the optical path length between the optical element 13 and the imaging system 14. Also, the shape of each SL is determined by the propagation angle of a light beam to the imaging system 14 from the aperture 13a.

With a change in the positions of the lenses SL and apertures 13a due to oscillation, temperature change, or over time, the propagation angle of a light beam to the imaging system 14 is changed, changing the incidence positions on the diffraction element 15 and the positions of diffracted images on the linear sensor 16. To prevent this, the Selfoc® lens array and optical element are set to be integrally replaceable to secure the accuracy of the propagation angle.

Figure 19:
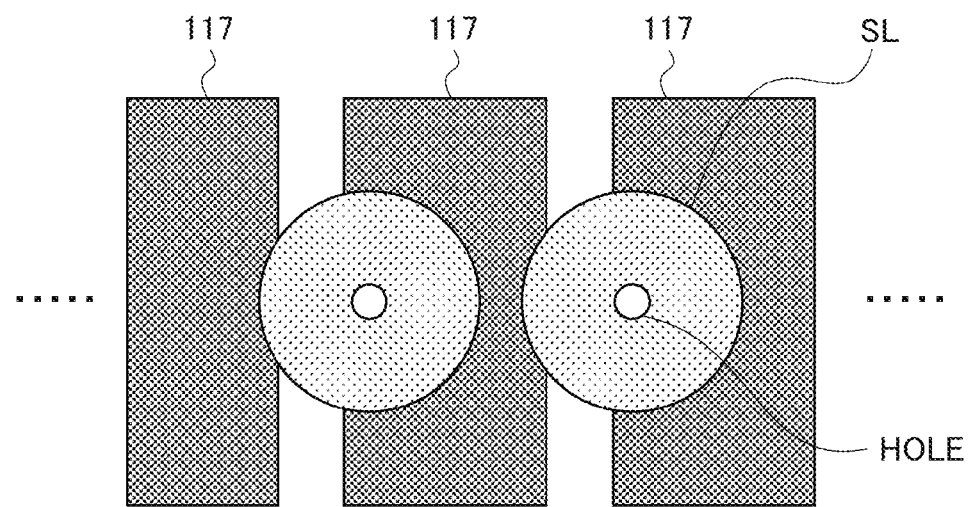
FIG. 19 shows the use of a slit element in FIG. 15A.

Further, the lenses SL and apertures can be arranged so that their centers match each other, and slit elements 117 can be provided to limit the reflected light to the lenses SL as in FIG. 19. This can exclude stray light from flares on the paper surface or multiple reflections by the surface of optical element as lens SL.

With use of an imaging system of a large diameter, the positions of centers of the lenses SL of the Selfoc® lens array in a direction parallel to the XY plane can match those of the centers of the corresponding apertures.

Further, in a case where the imaging system 14 cannot capture the reflected lights by the periphery area of the total image width even with use of the micro lens array 12, the micro lenses 12a and apertures 13a can be paired with the positions thereof shifted along X axis, as with use of the Selfoc® lens array. Thereby, the imaging system 14 can capture reflected lights by the total width of an image and the spectrometer 10 can measure wavelength spectrum in the total width of an image.

With use of an imaging system of a large diameter, the centers of the micro lenses 12a can match those of the corresponding apertures 13a. The reflected light incident on the micro lenses 12a can be limited by the slit element, as in the Selfoc® lens array.

With use of an imaging system of a large diameter, the positions of the centers of the micro lenses relative to a direction parallel to the XY plane can match those of the centers of the corresponding apertures.

Further, the imaging system 14 does not need to have an image-space telecentric optical property. However, the imaging system preferably owns optical property to allow the light beams from the apertures 13a to be incident in parallel on the diffraction element 15. Thus, the diffraction angles of the $+1^{st}$ diffracted images of the light beams from the apertures 13a can be equalized so that the apertures 17a can be formed in the same size and arranged along X axis with constant interval. This results in facilitating the design and manufacture of the mask element with reduced manufacturing costs.

In the present embodiment the lens array on the optical paths between the paper P and optical element 13 can be omitted. Instead, the optical element 13 can be closely disposed to the paper P.

Further, in the present embodiment the imaging system 14 does not need to be provided on the optical paths between the optical element 13 and diffraction element 15. Instead, the optical element 13 and diffraction element 15 can be closely disposed to each other.

Further, the present embodiment describes an example where the mask element 17 and linear sensor 16 are integrated. However, they can be separated.

Further, the shape of the apertures 17a of the mask element 17 should not be limited to be circular and it can be polygonal, ellipsoidal, rectangular or other shapes.

The present embodiment describes an example where the mask element 17 is a plate with apertures. Alternatively, it can be a glass plate which is coated with a black material of a certain shape such as chrome, carbon-containing resin or optical shield elements coupled with each other in a certain positional relation. The mask element can be arbitrarily configured as long as it can transmit only the $+1^{st}$ diffracted images of light beams from the apertures 13a.

In the present embodiment the four diffracted images, $-1^{st}$ to $+2^{nd}$ order, are used. Alternatively, for example, a $-2^{nd}$ order diffracted image is additionally used. The mask element 17 can also block the −2nd diffracted image.

Further, the micro lenses 12a of the micro lens array 12, apertures 13a of the optical element 13, and apertures 17a of the mask element 17 are two-dimensionally arranged in parallel to the XY plane. Alternatively, they can be one-dimensionally arranged in parallel to X axis, for example.

Further, instead of the linear sensor 16 including one-dimensionally arranged light receiving elements, an area sensor with two-dimensionally arranged light receiving elements can be used. In this case $+1^{st}$ order diffracted images can be incident on the same position along X axis and received at different light receiving elements. Therefore, the columns of apertures 17a can be at the same positions along X axis. So can the columns of the apertures 13a and the columns of the micro lenses 12a.

The light source unit 11 can be arbitrarily configured. For example, the collimate lens array 11b is omissible.

Further, the present embodiment describes an example where the image forming device is of electrophotographic type. Alternatively, it can be of inkjet type. In this case it can correct a color variation in a single paper or over papers by adjusting an ink blow amount in accordance with a head position or adjusting dot patterns.

Further, the number of toner colors can be five or six instead of four, for example.

In the present embodiment the toner image is transferred from the photoreceptor drums via the transfer belt. Alternatively, the toner image can be directly transferred on a paper.

The image forming device can use a medium such as photographic papers to produce colors by the thermal energy of beam spots.

Further, the spectrometer 10 is applicable to other devices in addition to the image forming device, for example, to an image evaluating unit to evaluate image quality on a medium, as shown in FIG. 20. The image evaluating unit comprises the spectrometer 10, a moving system as carrier stage to relatively move the medium and the spectrometer 10 in a direction intersecting with the light traveling direction from the light source unit 11, and a processor to evaluate an image according to the output signal of a light receiving system of the spectrometer. This image evaluating unit can properly evaluate image quality and is adoptable for an evaluation device for determining authenticity or kinds of paper money or credit cards. Also, it can evaluate images printed on materials such as plastic in addition to paper.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A spectrometer comprising:
a light source to project a light beam to a target object;
an optical element with a plurality of apertures through which the light beam reflected by the target object transmits;
a diffraction element to form diffracted images from a plurality of light beams having transmitted through the optical element; and
a light receiving element to receive the diffracted images formed by the diffraction element and including an optical shield to block a diffracted image other than a certain-order diffracted image.

2. A spectrometer according to claim 1, wherein
the light receiving element includes a plurality of apertures through which only the certain-order diffracted image the transmits.

3. A spectrometer according to claim 1, wherein
the apertures of the optical element and the apertures of the light receiving element are arranged in association with each other.

4. A spectrometer according to claim 1, wherein
the apertures of the optical element are two-dimensionally arranged to be parallel to a virtual plane including a certain axis and different in position from each other in a direction parallel to the certain axis.

5. A spectrometer according to claim 4, wherein
the apertures of the light receiving element are two-dimensionally arranged to be parallel to the virtual plane and different in position from each other in the direction parallel to the certain axis.

6. A spectrometer according to claim 1, further comprising
a lens array including lenses arranged in association with the apertures of the optical element.

7. A spectrometer according claim 1, further comprising
an imaging element on paths of the light beams between the optical element and the diffraction element.

8. The spectrometer according to claim 7, wherein
the imaging element has an image-space telecentric optical property.

9. An image evaluating unit to evaluate a quality of an image on a medium, comprising:
the spectrometer according to claim 1 to perform spectroscopy on an image;
a moving mechanism to relatively move the medium and the spectrometer in a direction intersecting with a traveling direction of the light beam from the light source; and
a processor to evaluate the image according to an output signal from the light receiving element of the spectrometer.

10. An image forming device to form an image under a condition based on image data, comprising:
a spectrometer according to claim 1; and
a controller to adjust the condition according to an output signal from the light receiving element of the spectrometer.

* * * * *